United States Patent
Jensen et al.

(10) Patent No.: US 8,695,515 B2
(45) Date of Patent: Apr. 15, 2014

(54) ROTARY KILNS FOR ALTERNATIVE FUELS

(75) Inventors: Lars Skaarup Jensen, Vallensbaek (DK); Niels Agerlund Christensen, Slagelse (DK); Morten Boberg Larsen, Smorum (DK)

(73) Assignee: FLSmidth A/S, Valby (DK)

( * ) Notice: Subject to any disclaimer, the term of this patent is extended or adjusted under 35 U.S.C. 154(b) by 380 days.

(21) Appl. No.: 13/201,484

(22) PCT Filed: Sep. 2, 2009

(86) PCT No.: PCT/IB2009/053832
§ 371 (c)(1),
(2), (4) Date: Aug. 15, 2011

(87) PCT Pub. No.: WO2010/032149
PCT Pub. Date: Mar. 25, 2010

(65) Prior Publication Data
US 2012/0009530 A1 Jan. 12, 2012

(30) Foreign Application Priority Data
Sep. 17, 2008 (DK) .................................. 2008 01299

(51) Int. Cl.
*A47J 36/00* (2006.01)
(52) U.S. Cl.
USPC .................... 110/246; 110/346; 431/2; 431/8; 431/11; 431/12; 431/174; 432/103; 432/105; 432/109
(58) Field of Classification Search
USPC ............. 431/2, 8, 11, 12, 174, 278; 432/103, 432/105, 109; 110/246
See application file for complete search history.

(56) References Cited

U.S. PATENT DOCUMENTS

| | | | | |
|---|---|---|---|---|
| 2,941,791 | A | * | 6/1960 | Wienert .......................... 432/109 |
| 3,180,725 | A | * | 4/1965 | Hans Rausch et al. .......... 75/478 |
| 3,758,089 | A | * | 9/1973 | Kocks ............................. 266/159 |
| 4,083,676 | A | * | 4/1978 | Ritzmann et al. ............... 432/14 |

(Continued)

FOREIGN PATENT DOCUMENTS

| | | |
|---|---|---|
| DE | 3320670 A1 | 12/1984 |
| DE | 3533775 A1 | 3/1987 |
| EP | 1334954 A1 | 8/2003 |
| WO | 8303601 | 10/1983 |

OTHER PUBLICATIONS

International Search Report of PCT/IB2009/053832 dated Dec. 17, 2009.

(Continued)

*Primary Examiner* — Jorge Pereiro
(74) *Attorney, Agent, or Firm* — Buchanan Ingersoll & Rooney PC

(57) ABSTRACT

A method for burning raw materials by which method the raw material and a secondary fuel are separately introduced to one and the same rotary kiln in which the raw material as well as the secondary fuel are heated by gases formed by burning of a primary fuel in the rotary kiln so that the secondary fuel is converted to gases and solid matter in the form of combustion residues such as ashes and coke. The secondary fuel during the process of conversion to gases and solid matter is kept separate from the introduced raw material, which may ensure that the secondary fuel and hence the locally reducing zones and major areas with reducing conditions are brought into minimum contact with the raw material.

20 Claims, 3 Drawing Sheets

(56) References Cited

U.S. PATENT DOCUMENTS

| | | | |
|---|---|---|---|
| 4,110,121 A * | 8/1978 | Rechmeier et al. | 106/745 |
| 4,220,631 A * | 9/1980 | Serbent et al. | 423/175 |
| 4,260,369 A * | 4/1981 | Warshawsky | 432/3 |
| 4,342,554 A * | 8/1982 | Rohrbach | 432/13 |
| 4,425,092 A * | 1/1984 | Brachthauser et al. | 432/106 |
| 4,494,928 A * | 1/1985 | Rohrbach | 432/13 |
| 4,517,020 A * | 5/1985 | Steinbiss et al. | 106/753 |
| 4,850,290 A * | 7/1989 | Benoit et al. | 110/346 |
| 4,913,742 A | 4/1990 | Kwech | |
| 4,930,965 A | 6/1990 | Peterson | |
| 5,454,715 A * | 10/1995 | Hansen et al. | 432/103 |
| 5,549,058 A | 8/1996 | Tutt | |
| 5,618,104 A * | 4/1997 | Koeberer et al. | 366/7 |
| 6,068,826 A * | 5/2000 | Maury et al. | 423/240 R |
| 6,146,133 A * | 11/2000 | Erhard et al. | 432/14 |
| 6,221,127 B1 * | 4/2001 | Rierson | 75/477 |
| 6,391,107 B1 * | 5/2002 | Reimann et al. | 106/739 |
| 8,075,686 B2 * | 12/2011 | Ichihara et al. | 106/752 |
| 8,240,589 B2 * | 8/2012 | Sommer et al. | 241/295 |
| 2003/0143508 A1 | 7/2003 | Ramesohl et al. | |

OTHER PUBLICATIONS

Written Opinion of the International Searching Authority of Application PCT/IB2009/053832.

PCT International Preliminary Report on Patentability for PCT/IB2009/053832 dated Jan. 14, 2011.

* cited by examiner

ROTARY KILNS FOR ALTERNATIVE FUELS

CROSS REFERENCE TO RELATED APPLICATION

This application is the United States national stage under 35 U.S.C. §371 of International Application No. PCT/IB2009/053832, filed on Sep. 2, 2009, which claimed priority to Danish Patent Application No. PA 200801299, filed on Sep. 17, 2008. The entirety of these applications is incorporated by reference herein.

FIELD OF THE INVENTION

The present invention relates to a method for burning raw materials such as cement raw meal, limestone or other mineral-containing raw materials, by which method the raw materials and a secondary fuel are separately introduced to one and the same rotary kiln in which both the raw material and the secondary fuel are heated by gases formed by burning of a primary fuel in the rotary kiln so that the secondary fuel is converted to gases and solid matter in the form of combustion residues. The invention also relates to a plant for carrying out the method and to the use of a rotary kiln according to the invention.

BACKGROUND OF THE INVENTION

Examples of various fuels that can be utilized as secondary fuel include car tires, railway sleepers, furniture, carpets, wooden waste, garden waste, kitchen waste, paper sludge, biomass, petcoke, wastewater sludge, meat and bone meal, fuller's earth, by-products from other industries and not finely ground coal.

The aforementioned method is known from the European Patent No. 0 105 322 B1. This patent gives a description of a method for manufacturing cement clinker where cement raw meal is heated in a preheater, introduced and burned into clinker in a rotary kiln and subsequently cooled in a clinker cooler. The heated cement raw meal and a secondary fuel are introduced to the rotary kiln in the same area and heated by contact with hot gases formed by burning of a primary fuel in the rotary kiln. Since the secondary fuel and the cement raw meal are introduced to the same area of the rotary kiln, the cement raw meal will be in considerable contact with the reducing zones created in connection with the combustion of the secondary fuel. Reducing zones are created when the stoichiometric ratio between oxidants (e.g. $O_2$) on the one hand and fuel and intermediate products from the combustion (such as free carbon, CO and $H_2$) on the other hand is such that the amount of fuel exceeds the amount of oxidants. Such reducing zones will always occur locally around a fuel particle and around combustible gases and liquids. According to the invention described in the European patent, there will be considerable contact between the cement raw meal and the reducing zones, entailing a number of disadvantages. Firstly, in areas of the kiln system with a counterflow between gases and the predominant solid matter portion, which is typically the case in the rotary kiln, the result will be material cycles where components are released from the cement raw meal to the gas phase in one zone of the kiln plant for subsequent re-absorption in the cement raw meal in another zone of the kiln plant and then directed back. For example sulfur may be part of such a cycle. Sulfur primarily takes the form of $CaSO_4$ or $CaSO_3$ in the cement raw meal. $CaSO_4$ is reduced by the following reactions (and other similar reactions).

$CaSO_4(s)+C(s) \rightarrow SO_2(g)+CaO(s)+CO(g)$ $CaSO_4(S)+CO(g) \rightarrow SO_2(g)+CaO(s)+CO_2(g)$ The sulfur is re-absorbed in the form of CaS (possibly CaSO3) when the gases are cooled and brought into contact with $CaO/CaCO_3$ as for example in the lowermost cyclone stages. This will cause sulfur to be accumulated in the system between the preheater and the reducing burning zone. Other occurrences, in addition to sulfur, will be material cycles with i.a. halogens (Cl, Br, F), alkali compounds (Na, K) and Mg, Pb, and Cd. Separately and combined the material cycles may give rise to increased build-up of coatings in the system, primarily in the riser duct. Also the flow properties of the solid matter may undergo changes in response to these cycles, e.g. resulting in cyclone blockages. It is desirable to avoid such coatings and the mentioned changes of flow characteristics since they will lead to build-up of material and blockage problems in the plant.

A second problem with reducing zones in the cement raw meal is that metals such as e.g. Fe and Cr will be reduced. For example Fe can be reduced according to the reaction indicated below.

Fe(III) reducing conditions→Fe(II)

Reducing metals may adversely affect the quality of the finished product and, therefore, they should be avoided.

In addition to the aforementioned disadvantages, there is also a risk that the cement raw meal when mixed with secondary fuel will deposit on the surface of the fuel, thereby completely or partially restricting the substance transport between gases and secondary fuel, resulting in a reduction of the fuel conversion rate.

SUMMARY OF THE INVENTION

It is the object of the present invention to provide a method for eliminating or significantly reducing the aforementioned disadvantages.

This is obtained according to the present invention by a method of the kind mentioned in the introduction, being characterized in that the secondary fuel is kept separate from the introduced raw materials during the process of conversion to gases and solid matter and in that the secondary fuel is introduced to and converted in an area of the rotary kiln which is located at a point before, in relation to the direction of the rotary kiln wowards a clinker cooler, the point where the cement raw meal is introduced to the rotary kiln. It is hereby obtained that the secondary fuel and hence the local reducing zones as well as large areas with reducing conditions make minimum contact with the raw material. Hence the aforementioned disadvantages associated with the reduction of the raw material will be reduced to an absolute minimum.

Examples of the chemical reactions for converting the secondary fuel include pyrolysis, combustion and gasification. The gases formed from these reactions will contain energy and potentially combustible gases and, therefore, they may be utilized as energy source/reaction gas in other processes, for example in the calciner. The composition of the released gases during the fuel conversion process will be of significance for the method and efficiency of energy transfer to subsequent processes. Also, if discharged from the rotary kiln and possibly cleaned, the gases may be utilized as reducing agent for other chemical processes. This is of particular interest if the gases are utilized in the minerals industry where a reduction of metals is often required.

In a preferred embodiment, the raw material will be cement raw meal which is preheated prior to being introduced to the rotary kiln in which it is burned to cement clinker which is subsequently cooled in a clinker cooler. It is preferred that the cement raw meal is preheated to at least 700° C. and furthermore that it has been completely or partially calcined prior to introduction. The cement raw meal and the secondary fuel are separately introduced through a number of inlets in the rotary kiln. The secondary fuel is introduced and converted in an area of the rotary kiln which is located at a point before, in relation to the direction of the rotary kiln towards the clinker cooler, the point where the cement raw meal is introduced to the rotary kiln. So, when undergoing conversion to gases and solid matter, the secondary fuel will be kept separate from the introduced cement raw meal. The distance between the two points of introduction may in principle assume any conceivable value as long as the distance is sufficient to ensure that the locally reducing zones as well as the larger areas with reducing conditions make minimum contact with the cement raw meal. However, it is preferred that the distance along the centerline of the rotary kiln between the two points of introduction is equal to at least the internal diameter of the rotary kiln. The point of introduction is taken to mean the centre of the location where the introduced material moves away from the inlet. The distance along the centerline of the rotary kiln between the two points of introduction is taken to mean the distance between the two points of introduction when they are projected perpendicularly to the centerline of the rotary kiln. The optimum distance will depend on a number of factors, but the distance should preferably be maintained within a range of between one and four times the internal diameter of the rotary kiln.

A method of the aforementioned kind may also contribute towards reducing the $NO_x$ content in the gases being formed when burning the primary fuel. The reduction of $NO_x$ is achieved when $NO_x$ in the gases passing through the rotary kiln are brought into contact with the reducing zones around the secondary fuel as well as pyrolysis gases and other reducing gases released during the fuel conversion process, thereby triggering various $NO_x$-reducing reactions and reducing $NO_x$ in the gases. It is preferred that some of the combustion air of the plant is detoured around the rotary kiln, for example via a duct directing hot air from the clinker cooler to a calciner. Hence the conversion of the secondary fuel in the rotary kiln will proceed at a lower rate and often at a lower temperature than would be the case if the full airflow were to pass through the rotary kiln.

If some of the airflow is detoured around the rotary kiln in the aforementioned duct, some of this air may advantageously be introduced together with the raw meal if it is desirable to have a higher temperature and increased conversion rate of the secondary fuel. Instead of preheated air from the cooler, completely or partially $O_2$ enriched air or other preheated process gases may be used.

In the area around the point of introduction of the secondary fuel, internally in the rotary kiln, means may be provided for mechanically influencing the secondary fuel so as to ensure intensified mixing of the solid phase of the fuel. Such means could be lifters either manufactured from metal, stone or heat-resistant material. During the rotation of the kiln, the lifters will lift the fuel to a higher level inside the rotary kiln, causing the fuel to descend through the gases again. This will lead to intensified mixing ratio, thereby increasing the surface contact between fuel particles and gases. This will increase the fuel conversion rate and can be utilized to promote the entrainment of solid matter in the flow of gases. Also it will ensure improved distribution of the reactants in the gases. Means, such as grinding media, provided in the area at the secondary fuel may be utilized for comminution of the fuel during the conversion process. This will be of particular relevance for the coke portion of the fuel which is extremely brittle and therefore easily comminutable by the grinding media with subsequent entrainment in the flow of gases and conversion in a subsequent calciner.

Means such as an upturned edge or a lattice structure may also be provided inside the kiln to restrict the area for burning the secondary fuel, thereby stopping the fuel from moving across the means and downstream through the rotary kiln until the fuel has attained the desired structural characteristics, as a consequence of heating. This will ensure that essentially only the ashes from the fuel will be able to move past the means and subsequently getting mixed with the cement raw meal.

In a further embodiment the rotary kiln comprises means for keeping the secondary fuel, while undergoing complete or partial conversion to gases and solid matter, away from the introduced raw material. In principle these means may consist of any suitable means as long as they have the capability to keep the secondary fuel separate from the raw material during the conversion process. However, it is preferred that the means comprise at least a duct in which the conversion of the secondary material takes place. This or these ducts may be provided inside the rotary kiln and may extend from the inlet end of the rotary kiln and further downstream into the rotary kiln. It is preferred that the ducts extend over a distance being equal to at least the internal diameter of the rotary kiln. To maximum practicable extent the ducts should be fitted centrally inside the rotary kiln, for example using some heat-resistant fixing means for attachment to the outer side of the ducts and the inner side of the rotary kiln, respectively. It is preferred that the centerlines of the pipes are substantially parallel to the centerline of the rotary kiln. At the end of the ducts located nearest the inlet end of the rotary kiln secondary fuel is introduced so that the secondary material in the duct is heated and converted by the gases formed by burning of a primary fuel in the rotary kiln with inflow of said gases into the system through the other end of the ducts. This other end of the pipes located furthest downstream of the rotary kiln may comprise means which will ensure that the solid matter portion of the completely or partially converted secondary fuel can advantageously be discharged from the ducts and mixed with the raw material which is introduced directly to the rotary kiln in a bypass relative to the ducts. In this way the secondary fuel will be kept separate from the introduced raw material during the process of conversion to gases and solid matter up to the point where the solid matter has been burned to an extent allowing it to be mixed with the raw material. The ducts may also be fitted on the outside of the kiln, with one end of the ducts being connected to one of the inlets and with the other end being connected to the rotary kiln. For both embodiments the reverse situation is also conceivable where the raw material is introduced to the ducts while the secondary fuel is introduced directly to the rotary kiln in a bypass relative to the ducts.

In a further embodiment the heated solid matter portion of the secondary fuel, before it is turned into ashes, is diverted from the rotary kiln and directed to a comminution apparatus in which it is reduced to smaller particle sizes. The fact that the fuel is heated prior to comminution will ensure that the subsequent comminution process will require far less resources which is primarily due to the fact that the conversion taking place during the heating process will significantly increase the brittleness of the heated fuel, thus making it easier to comminute than untreated fuel and the fact that the absolute mass of the heated fuel will be smaller because of the release of the volatile components during the heating phase. The heated and comminuted fuel may subsequently, for example, be utilized as primary fuel in the rotary kiln, the calciner or in other processes. Hence it will be possible to substitute significant elements of or the entire fuel requirement in a kiln system through the use of relatively low-cost secondary fuels.

In a special embodiment the rotary kiln comprises two separate sections connected to one another through means allowing the two sections to operate at different rotational speeds. As a consequence hereof, the section with the secondary fuel will be able to rotate at a velocity specifically adapted to this combustion process, making it possible to optimize the process on an individual basis.

Other details, objects, and advantages of the invention will become apparent as the following description of certain present preferred embodiments thereof and certain present preferred methods of practicing the same proceeds.

BRIEF DESCRIPTION OF THE DRAWINGS

The invention will now be explained in further details with reference to the drawing, being diagrammatical, and where.

DETAILED DESCRIPTION OF PRESENT PREFERRED EMBODIMENTS

Figure 1:
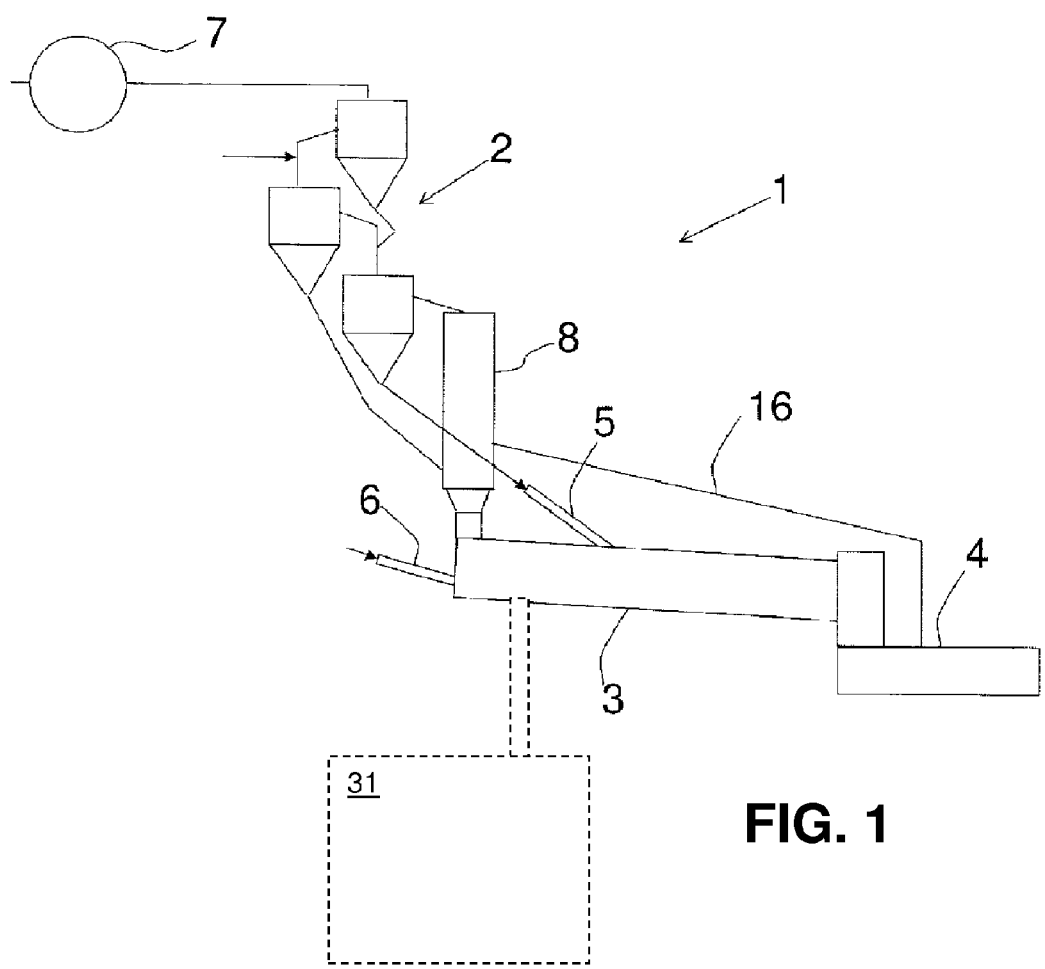
FIG. 1 shows a plant for carrying out the method according to the invention.

In FIG. 1 is shown a plant 1 for manufacturing cement clinker in which cement raw meal is preheated in a preheater 2 and burned to clinker in a rotary kiln 3 and subsequently cooled in a clinker cooler 4. The preheated cement raw meal and a secondary fuel are introduced through separate inlets 5, 6 in one and the same rotary kiln. Both the cement raw meal and the secondary fuel will be heated by gases formed by burning of a primary fuel in the rotary kiln 3 so that the secondary fuel is converted to gases and solid matter in the form of combustion residues. The process gases are drawn in known manner through the rotary kiln 3 and onward through the preheater 2 by means of a fan 7. The gases formed during the heating of the secondary fuel, inclusive of solid matter entrained in the gases, may be utilized for additional process stages, such as in a calciner 8. Hot air from the clinker cooler 4 is directed to the calciner 8 via a duct 16. The secondary fuel is introduced through the inlet 6 and converted in an area of the rotary kiln 3 located at a point before, in relation to the direction of the rotary kiln towards the clinker cooler 4, the point of introduction of the inlet 5 for the cement raw meal to the rotary kiln 3. As a consequence hereof, the secondary fuel will during the process of conversion to gases and solid matter to a large extent be kept away from the introduced cement raw meal and the locally reducing zones and large areas with reducing conditions will make minimum contact with the cement raw meal. Subsequent to the conversion process the ashes from the secondary fuel may either be utilized in the forming of cement clinker or be extracted together with the cement clinker. The heated solid matter portion of the secondary fuel, before it is turned into ashes, can be diverted from the rotary kiln 3 and directed to a comminution apparatus 31, which is shown in broken line in FIG. 1. The solid matter portion of the secondary fuel may be reduced to smaller particle sizes via the comminution apparatus 31. The fact that the fuel is heated prior to comminution may ensure that the subsequent comminution process will require far less resources which is primarily due to the fact that the conversion taking place during the heating process will significantly increase the brittleness of the heated fuel, thus making it easier to comminute than untreated fuel and the fact that the absolute mass of the heated fuel will be smaller because of the release of the volatile components during the heating phase. The heated and comminuted fuel may subsequently, for example, be utilized as primary fuel in the rotary kiln 3, the calciner 8 or in other processes. Hence it can be possible to substitute significant elements of or the entire fuel requirement in a kiln system through the use of relatively low-cost secondary fuels.

Figure 2:
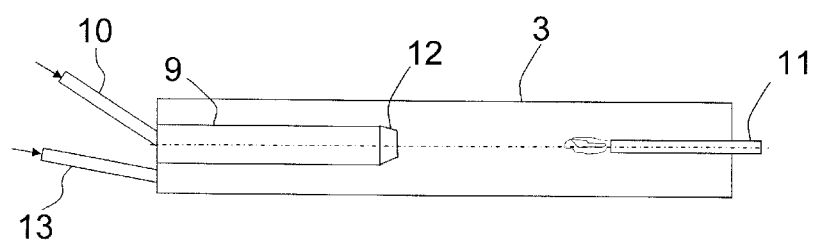
FIGS. 2 and 3 show two embodiments according to the invention.

In FIG. 2 is shown a plant comprising a rotary kiln 3 in which a duct 9 is mounted centrally in the rotary kiln 3. The centerline of the duct 9 is parallel to the centerline of the rotary kiln 3. At the end of the duct 9 closest to the inlet end of the rotary kiln 3, secondary material is introduced through an inlet 10 so that the secondary material in the duct 9 is heated and converted by gases formed by a burner 11 burning a primary fuel in the rotary kiln 3, with inflow of said gases through the second end of the duct 9. This other end of the duct 9 which is furthest downstream of the rotary kiln comprises means 12 which will ensure that the solid matter portion of the converted secondary material must have attained the desired degree of conversion before it leaves the duct 9 and is mixed with the raw material being introduced through an inlet 13 directly into the rotary kiln 3 in a bypass relative to the duct 9. In this way, the secondary fuel will, during the process of conversion to gases and solid matter, be kept separate from the raw material introduced until the solid matter has been converted to extent where it can be mixed with the raw material. The reverse situation is also conceivable where the raw material is introduced through the inlet 10 into the duct 9 while the secondary fuel is introduced through the inlet 13 directly into the rotary kiln 3 in a bypass relative to the duct 9.

Figure 3:
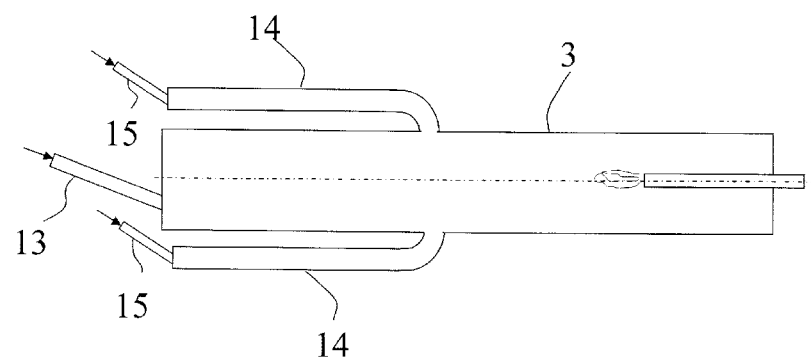

In FIG. 3 is shown a plant comprising a rotary kiln 3 where on the outside of the rotary kiln 3 two ducts 14 are provided and connected to the rotary kiln 3. At one end of the ducts 14 the secondary material is introduced through two inlets 15 so that the secondary material in the pipes 14 are heated and converted by the gas inflow through the other end of the ducts 14 which is connected to the rotary kiln. The raw material is introduced directly to the rotary kiln 3 through the inlet 13.

While certain present preferred embodiments of the kiln and certain embodiments of methods of practicing the same have been shown and described, it is to be distinctly understood that the invention is not limited thereto but may be otherwise variously embodied and practiced within the scope of the following claims.

The invention claimed is:
1. A plant comprising:
    a kiln in which raw material and secondary fuel are introduced and heated by gases formed by burning of a primary fuel in the kiln, the kiln having at least one first inlet for introducing the raw material and at least one second inlet for introducing the secondary fuel, the at least one first inlet and at least one second inlet positioned such that the raw material is introduced into the kiln separately from the secondary fuel;
    the kiln also having an apparatus for keeping the secondary fuel separate from the raw material while the secondary fuel is converted; and
    wherein the secondary fuel is introduced to and converted in an area of the kiln that is located farther from a clinker cooler than an area in which the raw material is introduced into the kiln such that the secondary fuel is introduced to the kiln prior to the raw material as the secondary fuel and raw material move through the kiln toward the clinker cooler.

2. The plant of claim 1 wherein the raw material is cement raw meal and the kiln is a component of a kiln system, the kiln system also comprising a preheater that preheats the cement raw meal before it is introduced into the kiln.

3. The plant of claim 2 further comprising a clinker cooler that cools the cement raw meal after it is burned.

4. The plant of claim 1 wherein the apparatus for keeping the secondary fuel separate from the raw material while the secondary fuel is converted is comprised of at least one duct connected to the at least one second inlet.

5. The plant of claim 1 wherein the apparatus for keeping the secondary fuel separate from the raw material while the secondary fuel is converted is comprised of at least one duct provided outside of the kiln, the at least one duct having a first end connected to the at least one second inlet and a second end connected to the kiln.

6. The plant of claim 1 wherein the kiln is a rotary kiln.

7. The plant of claim 1 wherein the kiln has two separate sections connected to each other such that each of the sections is operable at different rotational speeds.

8. A method for burning materials comprising:
separately introducing raw material and a secondary fuel to a kiln;
heating the raw material and the secondary fuel by burning of a primary fuel in the kiln such that the secondary fuel is converted to gases and solid matter; and
keeping the secondary fuel separate from the raw material while the secondary fuel is converted to gases and solid matter; and
wherein the secondary fuel is introduced to and converted in an area of the kiln that is located farther from a clinker cooler than an area in which the raw material is introduced into the kiln such that the secondary fuel is introduced to the kiln prior to the raw material as the secondary fuel and raw material move through the kiln toward the clinker cooler.

9. The method of claim 8 wherein the raw material is cement raw meal that is preheated to at least 700° C. prior to being introduced to the kiln and wherein the kiln is a rotary kiln.

10. The method of claim 9 further comprising burning the cement raw meal to cement clinker in the kiln for subsequently being cooled in a clinker cooler.

11. The method of claim 8 wherein a distance along a centerline of the kiln between the area of introduction into the kiln for the secondary fuel and an area of introduction of the raw material into the kiln is equal to at least an internal diameter of the kiln.

12. The method of claim 8 further comprising mixing the solid matter of the converted secondary fuel with the raw material.

13. The method of claim 8 wherein the solid matter is diverted from the kiln and directed to a comminution apparatus.

14. The method of claim 13 further comprising comminuting the solid matter via the comminution apparatus to reduce the solid matter to smaller particle sizes.

15. A method for burning raw material comprising:
separately introducing a secondary fuel and the raw material into a rotary kiln;
heating the secondary fuel and the raw material via gases formed by burning a primary fuel in the rotary kiln such that the secondary fuel is converted to gases and solid matter, the solid matter of the burned secondary fuel comprising combustion residues;
wherein the secondary fuel is kept separate from the separately introduced raw material during the conversion of the secondary fuel to gases and solid matter, the secondary fuel being converted in an area of the rotary kiln that is located farther from a clinker cooler than an area in which the raw material is introduced into the rotary kiln such that the secondary fuel is introduced to the rotary kiln prior to the raw material in relation to a direction at which the secondary fuel and raw material move through the kiln toward the clinker cooler.

16. The method of claim 15 wherein a position of the introduction of the secondary fuel is spaced apart from a position of the introduction of the raw material by a distance along a centerline of the rotary kiln, the distance being equal to an internal diameter of the rotary kiln or being a value greater than the internal diameter of the rotary kiln.

17. The method of claim 15 wherein the raw material is cement raw meal that is preheated to at least 700° C. prior to being introduced into the rotary kiln and wherein the cement raw meal is burned into cement clinker in the rotary kiln and wherein the method further comprises cooling the cement clinker in a clinker cooler.

18. The method of claim 15 wherein the secondary fuel is kept separate from the separately introduced raw material during the conversion of the secondary fuel to gases and solid matter via at least one duct connected to the rotary kiln.

19. The method of claim 15 wherein the secondary fuel is kept separate from the separately introduced raw material during the conversion of the secondary fuel to gases and solid matter via at least one duct positioned at least partially within the rotary kiln.

20. The method of claim 15 wherein the secondary fuel is kept separate from the separately introduced raw material during the conversion of the secondary fuel to gases and solid matter via at least one duct that receives the separately introduced secondary fuel.

* * * * *